United States Patent
Wilson et al.

(10) Patent No.: US 8,793,614 B2
(45) Date of Patent: Jul. 29, 2014

(54) HISTORY-BASED TRACKING OF USER PREFERENCE SETTINGS

(75) Inventors: Jeffrey T. Wilson, Ashburn, VA (US); Mark H. Goldstein, Chantilly, VA (US)

(73) Assignee: AOL Inc., Dulles, VA (US)

( * ) Notice: Subject to any disclaimer, the term of this patent is extended or adjusted under 35 U.S.C. 154(b) by 1377 days.

(21) Appl. No.: 12/126,770

(22) Filed: May 23, 2008

(65) Prior Publication Data

US 2009/0293018 A1 Nov. 26, 2009

(51) Int. Cl.
G06F 3/048 (2013.01)
(52) U.S. Cl.
USPC .......................................... 715/811
(58) Field of Classification Search
USPC ................ 715/811; 709/217, 248, 201, 224
See application file for complete search history.

(56) References Cited

U.S. PATENT DOCUMENTS

| | | | |
|---|---|---|---|
| 5,875,468 A | 2/1999 | Erlichson et al. | |
| 6,018,344 A * | 1/2000 | Harada et al. | 715/818 |
| 6,327,609 B1 * | 12/2001 | Ludewig et al. | 709/203 |
| 6,959,420 B1 * | 10/2005 | Mitchell et al. | 715/745 |
| 7,149,982 B1 * | 12/2006 | Duperrouzel et al. | 715/788 |
| 2001/0032258 A1 * | 10/2001 | Ishida et al. | 709/224 |
| 2003/0066031 A1 * | 4/2003 | Laane | 715/513 |
| 2003/0131045 A1 * | 7/2003 | McGee et al. | 709/201 |
| 2004/0181609 A1 * | 9/2004 | Ullmann et al. | 709/245 |
| 2005/0002507 A1 | 1/2005 | Timmins et al. | |
| 2005/0193053 A1 * | 9/2005 | Kendall et al. | 709/200 |
| 2006/0069616 A1 * | 3/2006 | Bau | 705/14 |
| 2007/0143439 A1 | 6/2007 | Szabo et al. | |
| 2007/0277127 A1 * | 11/2007 | Carlson et al. | 715/867 |
| 2008/0139112 A1 * | 6/2008 | Sampath et al. | 455/3.04 |
| 2009/0012937 A1 * | 1/2009 | Lee et al. | 707/3 |
| 2009/0106228 A1 * | 4/2009 | Weinman, Jr. | 707/5 |
| 2012/0016655 A1 * | 1/2012 | Travieso et al. | 704/2 |
| 2012/0144291 A1 * | 6/2012 | Chang et al. | 715/234 |

OTHER PUBLICATIONS

Jakobson et al., "Invasive browser sniffing and countermeasures," International World Wide Web Converence, www 2006, May 23-26, 2006, 10 pages, Edinburgh, Scotland.
Bug 57351—css on a:visited can load an image and/or revel if visitor been to a site, https://bugzilla.mozilla.org/show_bug.cgi?id=57351, Printed Aug. 22, 2008, 7 pages.
Affected: web browsers with CSS support, http://www.doxdesk.com/personal/posts/bugtraq/20020214-css.html, Printed Aug. 22, 2008, 3 pages.

(Continued)

Primary Examiner — Rashawn Tillery
(74) Attorney, Agent, or Firm — Finnegan, Henderson, Farabow, Garrett & Dunner LLP (57) ABSTRACT

A process is disclosed for using the existing Universal Resource Identifier (URI) history feature of browsers to maintain user preference settings, or other state information, used by one or more web sites or other systems. In one embodiment, when a user makes a particular preference selection on a web site, the user's selection is recorded in the browser's URI history by causing the browser to access a URI (or a set of URIs) representing the particular selection. The same or a different web site may subsequently test the browser's URI history for this particular URI by including appropriate JavaScript or other executable code in a page requested by the browser. Depending upon the outcome of this test, the web site and/or the page's executable code may take an appropriate action or inaction consistent with the preference selection.

22 Claims, 3 Drawing Sheets

(56) References Cited

OTHER PUBLICATIONS

Bugtraq: CSS visited pages disclosure, http://seclists.org/bugtraq/2002/Feb/0271.html, Printed Aug. 22, 2008, 4 pages.

Guessing Your Bank, http://www.cs.indiana.edu/~sstamm/projects/recon/, Printed Aug. 22, 2008, 2 pages.

Javascript Visited Link Scanner, http://www.gnucitizen.org/projects/javascript-visited-link-scanner/, Printed Aug. 22, 2008, 3 pages.

I know where you've been, http://jeremiahgrossman.blogspot.com/2006/08/i-know-where-youve-been.html, Printed Aug. 22, 2008, 14 pages.

Same Origin Policy: Protecting Browser State from Web Privacy Attacks, http://crypto.stanford.edu/sameorigin/, Printed Aug. 22, 2008, 2 pages.

Steal Browser History Without JavaScript, http://ha.ckers.org/blog/20070228/steal-browser-history-without-javascript/, Printed Aug. 22, 2008, 5 pages.

Using: Visited and expression() to detect any visited link, http://milov.nl/2520, Printed Aug. 22, 2008, 3 pages.

International Search Report and Written Opinion issued in counterpart PCT application No. PCT/US 09/44028.

* cited by examiner

HISTORY-BASED TRACKING OF USER PREFERENCE SETTINGS

BACKGROUND

1. Technical Field

The present disclosure generally relates to the maintenance of user state and historical data, such as (without limitation) web identity, personal information, privacy preferences, opt-out choices, and prior user actions and behavior, using a browser program.

2. Description of the Related Art

HTTP cookies are a commonly used by web server systems to store user attribute data on user computing devices. When a user requests a web page, the user's browser sends the previously stored cookie or cookies pertaining to the requested page with the page request. The web server system typically uses the received cookie data to personalize the requested page, and/or to track the user's browsing behavior.

To protect user information, browsers are designed to transmit only those cookies that correspond to the domain of the requested page or other object. Thus, a cookie set by a web server in one Internet domain ordinarily will not be transmitted to a web server in another Internet domain. In some cases, a web page of a site may include a reference that allows a third party site to set a cookie on the computing devices of users who access the page. Such third-party cookies are used extensively in the online advertising and analytics industries to identify behavior associated with a pseudonymous user identification code, allowing these companies to associate multiple behaviors across a myriad of sites with a single pseudonymous identity.

It has also become common practice for a site that engages in behavioral tracking to offer users the opportunity to not participate, or "opt-out" of the tracking. The users' opt-out preferences are commonly stored on the user computing devices as cookies. One problem with this approach is that it is not well suited for enabling a user to make a single opt-out or other preference selection that applies to multiple web sites across multiple domains. Another problem is that privacy management and security tools commonly delete the cookies that represent the users' opt-out and other preference selections.

There is thus a need for an improved system and method for storing user preference data and/or other state data.

SUMMARY OF THE DISCLOSURE

A system, method, and computer program product are provided for using the existing Universal Resource Identifier (URI) history feature of browsers to maintain state information, such as user preference selections, used by one or more web sites or other systems. For example, in one embodiment, when a user makes a particular preference selection on a web site, the user's selection is recorded in the browser's URI history by causing the browser to access a URI (or a set of URIs) representing the particular selection. The same or a different web site may subsequently test the browser's URI history for this particular URI by including appropriate JavaScript or other executable code in a page requested by the browser. Depending upon the outcome of this test, the web site and/or the page's executable code may take an appropriate action or inaction consistent with the preference selection. The preference selection may, for example, represent a user's request not to be tracked, and/or may represent a user's preference for a particular type of content.

In contrast to cookie-based approaches, this URI-history based approach enables the user preference settings to be shared across multiple Internet domains. For example, web site may present an option that enables a user to perform a single opt-in or opt-out action that applies to many different web sites and business entities. The method may, however, be used in combination with cookies to provide a more robust mechanism for maintaining user preference data. The disclosed approach may also be used in combination with the methods disclosed in commonly-owned U.S. patent application Ser. No. 11/580,023, filed Nov. 13, 2006, hereby incorporated by reference in its entirety, in which a browser cache is used to store user state data.

BRIEF DESCRIPTION OF THE DRAWINGS

Embodiments of the invention are illustrated in the accompanying drawings.

DETAILED DESCRIPTION OF PREFERRED EMBODIMENTS

In the following detailed description, numerous specific details are set forth in order to provide a thorough understanding of specific embodiments of the present invention. However, it will be understood by those skilled in the art that the present invention may be practiced without these specific details. Thus, nothing in this detailed description is intended to imply that any particular feature, characteristic, or component of the disclosed system is essential to the invention. The invention is defined only by the claims. In other instances, well-known methods, procedures, and components have not been described in detail so as not to obscure the present invention.

1. Overview

A method and system are disclosed that enables a web site to record a user's preference selection and/or other state information in a URI history maintained by the user's browser. The same web site and/or a different web site (which may operate in a different Internet domain) may subsequently test the URI history to determine whether the particular preference selection has been made.

Broadly speaking, some embodiments of the system cause loadable or executable web code to be included in responses to user's browsers, wherein the web code uses the browser's URI history to determine the user's privacy or other settings. The same system may, for example, have previously caused the user's preferred privacy settings to be stored into the user's browser's URI history. The system may subsequently take action upon the information located in the URI history, where such action may include causing the user to receive differentiated content, causing more or less information about the user to be retained on the server, performance of additional processing on the web server or the user's computing device, and so forth. No modifications to existing browsers are required, and no additional software needs to be installed on the user's computing device.

The typical browser URI history has several features which make it particularly well-suited to storing information regarding a user's preferred privacy options. First, typical browsers do not allow unrestricted access to URI histories. So, for example, a section of web-page-based JavaScript executing on a user's computer typically will be afforded a set of privileges sufficient only to test for the existence of a specific, known URI entry in the URI history. The JavaScript will not have sufficient privileges to read all entries, search entries, create entries, or delete entries. In other words, a section of JavaScript may be able to ask "Does URI foo.com/bar/baz.html exist in the history, yes or no?" but will not be able to ask for a list of entries in the history. These access restrictions, which are implemented within most or all commercially available browsers such as Microsoft Internet Explorer and Mozilla Firefox, make the URI history feature attractive for storing information regarding a user's privacy preferences. As a program (such as JavaScript) has to know the exact URI to check for in the history, malicious programs are largely precluded from "going fishing" in the URI history to mine users' preferences. Unless the malicious programs know the exact URI to check for, they will be unable to access privacy settings stored in the history.

Secondly, and as opposed to cookie storage mechanisms, browsers typically allow cross-site and cross-domain checking of URI history entries. So, for example, a section of JavaScript downloaded from alpha.foo.com/one/two may be able to check for the existence of each of the following URIs in the history: alpha.foo.com/three/four, beta.foo.com/five, and bar.com/six. In contrast, cookies set by the domain bar.com are typically unavailable for access by JavaScript executing off a web-page located at foo.com. Such cross-domain access is particularly useful when coupled with a system for sharing privacy information, because the privacy information may be set by code at one domain (e.g. opt-out-of-everything.com) and read by code on multiple different domains (e.g., merchantl.com,searchengine2.com).

For example, a trusted entity could operate a web site (e.g., www.preferences.org) that enables users to select between various privacy-related and personalization-related options. This web site could respond to the user's selection by causing a corresponding "standardized" URI to be written the URI history of the user's browser (as described below). Web sites operated by other entities in other domains could then check for this and other standard URIs, and could serve content that corresponds to the user's settings. Different standard URIs could be provided for different global settings or preferences (e.g., "no tracking," "anonymous tracking only," "no tracking of search query submissions," "do not use my purchase history to display product recommendations," "display my name when I am recognized," etc.).

Thirdly, probably because web code objects are typically granted only limited access to URI histories, users may be less likely to clear their URI histories than they are to clear their cookies, cache, or local storage. Automated security programs, designed to remove personal information from a user's machine, may be less likely to clear URI histories for a similar reason. Depending upon the access patterns of the user, URI history entries may also have a longer effective lifetime than that afforded to caches or cookies. As such, URI histories are an excellent location to store persistent data regarding a user's preferred privacy options.

A system which uses URI histories to store state information may also be useful for synchronizing two or more redundant storage locations, wherein loss or damage of user attribute data may be restored from redundant storage based on an algorithm, thereby preserving the data integrity. Example alternate locations for storage include, without limitation, browser cookies, browser cache, Flash Shared Objects store, storage allocated to Java applets, and other storage media available to the browser, such as random-access memory. The management of such storage locations may occur in spite of manual or automatic clearing of HTTP cookies, HTTP cache, URI history or other storage locations by a user or a computer software tool, such as (without limitation) those providing security and/or privacy functions related to Internet browsing, so long as a single storage location remains. Such alternative sources may be algorithmically maintained, for example, wherein the authoritative storage locations used to synchronize user attribute data may be based on criteria, such as, for example, persistency of cookies, and/or Internet cache vitality. Expiration or absence of a cookie, for example, may trigger resynchronization of the user attribute data against the relevant URI history entries, wherein user attribute data within the storage location may be compared to each other, such that a determination may be made as to which data location if any contains up-to-date user attribute data, and therefore, may be considered authoritative.

One embodiment of the present invention comprises a system and method for preserving the identity, personal information, and/or opt-in and opt-out choices of a user. One generally accepted opt-out choice is a method of requiring a targeted user to explicitly respond to a solicitation in order to keep from receiving some service or "widget," usually associated with marketing. In this embodiment, the identity and opt-out choice may be simply pieces of information to be stored and retrieved from the browser or other storage locations available to the browser or browser plug-ins at the appropriate time. Further to this embodiment, if one storage location loses user attribute data, such as an opt-out choice, an alternative storage location may provide a source of user attribute data to re-synchronize the lost data; thereby maintaining the integrity of each storage location and user attribute data therein. The storage and retrieval of arbitrary data follows from the particular embodiment.

Browsers may maintain histories, repositories, or other stores of information in addition to a URI history. It is contemplated that such applications may provide methods of accessing these histories or repositories similar to those provided by web browsers implementing URI histories as described herein. As such, these histories and repositories may be used to store state information using mechanisms similar to those disclosed herein.

For example, browsers may also use and/or implement protocols other than HTTP, such as NNTP, RSS, Gopher, etc. These protocols may lend themselves to additional (or alternative) use of repositories. Moreover, browser plugins, such as Flash or Silverlight, may perform communication or transmission outside of an established HTTP connection. A browser executing such a plugin may maintain a separate history or repository, potentially distinct from the URI history, for resources requested or used by the plugin. The browser or plugin may provide access to such a history on conditions similar to those discussed above for URI histories. In browsers that implement multiple protocols, history information created under one protocol may be read or used under another protocol.

It is contemplated that such repositories may be designed to track or maintain information distinct from that of typical browser URI histories, viz., tracking URIs accessed through HTTP. For example, a browser may maintain a history of terms that a user has searched for using a browser toolbox. Such repositories may be used to infer user choice or behavior, and thereby may be used to perform additional processing. In the case of a browser history of search terms, a certain privacy choice may be inferred from the existence of such terms as "how to opt-in to retailer.com" or "retailer.com privacy policy." Those of skill in the art will recognize that these examples may be generalized to repositories that store, in general, information indicative of user history, behavior, and choices.

2. System Components

Figure 1:
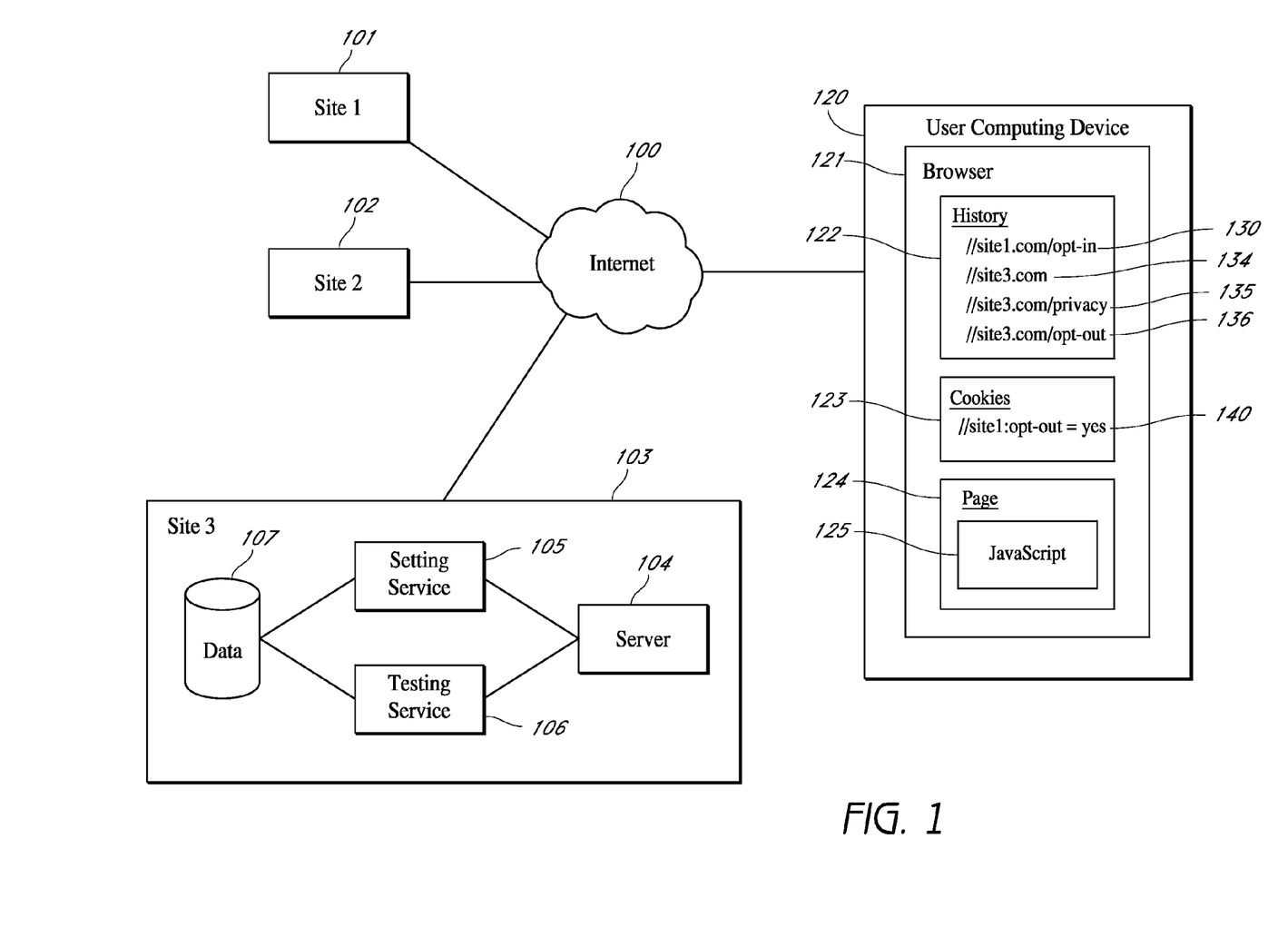
FIG. 1 is a schematic block diagram of a demonstrative architecture of a system in accordance with some embodiments of the invention.

FIG. 1 illustrates a schematic block diagram of a demonstrative architecture of a system in accordance with some embodiments of the invention. Web sites 101, 102, and 103 are connected via the Internet 100 to each other and to at least one user computing device or machine 120 such as a personal computer, personal digital assistant, mobile phone, or television set-top box.

A user's computing device 120 typically includes a browser 121. As used herein, the term "user computing device" may refer to, for example and without limitation, personal computers, mobile phones, internet kiosks, embedded processors, gaming systems, other types of computing systems capable of being used by a user to access content on a network, and so forth.

A browser 121 typically maintains or includes a URI history 122, a cookie repository 123, and a page display 124. The term "browser" is used broadly and may refer to, for example and without limitation, applications like Internet Explorer, Opera, Firefox, Lynx, as well as embedded browsers, branded browsers, and "headless" internet processors, web crawlers and spiders, and other programs or applications that are capable of formatting network content for consumption.

A URI history 122 contains a listing of at least some of the URIs recently visited or rendered by the browser 122. A URI history may be stored in RAM, non-volatile memory, a database, a flat file, or some combination thereof URI history entries may be set, deleted, or modified through the typical mechanisms provided by particular storage medium. Entries may be stored as plain text, XML, encrypted, and/or obfuscated. A browser 122 may occasionally clear or reset entries in the URI history 122, and a browser 122 need not necessarily add all visited URIs to the history 122. The URI history is typically used to allow the browser 121 to provide the user 122 with an indication of which web pages have been previously visited. One such indication is to highlight previously visited links with a different color than non-visited links.

A cookie repository 123 contains cookies 140 set by web servers accessed by the browser. Cookies are name-value pairs associated with a particular domain, and are commonly stored on the user computing device 120 with associated cookie attribute data. When a browser sends a URI request to a web server, it may include in the request one or more cookies corresponding to the URI's domain.

A web page 124 is the result of the browser's 121 processing, execution, and/or display of web code received in responses from web sites 101-03. Web page code need not be displayed or rendered as a web page in order to have its executable sections, if any, executed. Browsers will typically provide facilities for execution of types of executable web code such as JavaScript 125. A variety of additional client side scripting or programming languages likely to be supported by a given browser 121 include, but are not limited to, Java applets, Flash ActionScript, a customer browser plug-in or an installed piece of code on the user's computer.

JavaScript, herein illustrated as a JavaScript section of the web page 124, refers in particular to the scripting language often used for client-side web development. A section of JavaScript code 125 is typically executed by the browser 121 within a "sandbox", i.e. with limited privileges to the user machine and browser's underlying data structures and methods. One such typical privilege limitation is restricted access to the URI history and cookie repository. One of skill in the art will recognize that some embodiments of the invention will use mechanisms other than JavaScript to query the URI history. Among others, client-side code in nearly any language supported by the browser 121 (such as those described above) that supports functionality similar to that of the JavaScript described below may work.

A particular web site 103 may be comprised of a web server 104, a setting service 105, a testing service 106, and/or a database 107, each of which may be implemented on one or more physical servers or machines. The use of the word "service" is meant broadly and without limitation, and is used generally to refer to a collection of computer-implemented functionality. Neither the testing service nor the setting service need be distinct or separable components of a computer system and they need not be distinct from the web server 104 or any other element of the web site 103.

The web server 104 typically receives requests over the Internet 100 from user computing device 120. The web server 104 typically responds to such requests with a web page containing (without limitation) HTML code, JavaScript code, widget code, applet code, style sheets, XML, XHTML, AJAX, and/or other content (all of which is hereinafter referred to as "web code.") The web server 104 may query the setting service 105 and/or the testing service 106 for web code appropriate to save or retrieve state to/from the URI history 122 of the requesting browser 121.

The setting service 105 typically responds to a query by the web server 104 with web code appropriate to cause the creation of entries in a browser's URI history 122 when the code is loaded, rendered, or executed on the user's computing device 120. The setting service 105 may access a database 107 to retrieve or store information regarding the known preferences or attributes of a user 120. The setting service 105 is optional in the sense that a user's URI history 122 will typically automatically store visited URIs 130, 134-136 in the history. As such, a setting service may be most useful if a web site 103 intends to store complex values or state in a user's history 122.

The testing service 106 typically responds to a query by the web server 104 with web code appropriate to take action based on the existence of one or more entries in a browser's URI history 122 when the code is executed on the user's computing device 120. The testing service 105 may access a database 107 to retrieve or store information regarding the known user preferences or attributes associated with a user computing device 120.

3. System Operation

With reference to FIG. 1, one illustrative use of one embodiment of the system will now be described. Broadly speaking, this example will illustrate how the system may be used to store the user's preferred opt-out policy across HTTP sessions without requiring the user to sign in, use cookies, or maintain the same IP address.

At the direction of a user, the computing device 120/browser 121 makes an initial request to the home page of Site3 103, viz. site3.com. Such a request is typically initiated by a user by typing a web page address into the location bar of a client browser 121, selecting a bookmark in the browser 121, or by selecting a hyperlink displayed in the page area 124 of the browser 121, although other mechanisms of initiating a request are possible. The browser then typically transforms the user's request into an encoding appropriate for machine communication and transmission. This request may be through the HTTP or HTTPS protocols, or generally through any protocol for which clients are capable of executing client-side code and recording accessed locations. In the case of HTTP and HTTPS, requests include a Uniform Resource Identifier (URI), which is a unique identifier that describes the location of a particular resource. Examples of URIs include http://www.ietf.org/rfc/rfc2396.txt, news:comp.infosystems.www.servers.unix, and telnet://192.0.2.16:80/. URIs are described in detail in Request For Comment 3986, available at http://tools.ietf.org/html/rfc3986, which is hereby incorporated by reference in its entirety. Requests may include additional information, as defined by the relevant protocol, including cookies, etc.

Requests emanating from the user's browser 121 are routed through the user's computing device 120, and thereafter through the internet 100, or, more generally, any type of communications network, to Site3's web server 104. Some embodiments of internet routing are described in Requests For Comment 791 and 793, available at http://tools.ietf.org/html/rfc791 and http://tools.ietf.org/html/rfc793, respectively, both of which are hereby incorporated by reference in their entirety.

Upon receipt of a request, typically the web server 104 will attempt to fulfill the request by provisioning and returning content to the user 120. Often, the content to be returned to the user 120 will be dependent upon information contained in the request (such as cookie data) and on information contained in Site3's general data repositories (not shown, but such as user authentication information, user preferences, past browsing history, and so forth). Content may include text, images, movies, executable code, stylistic elements, tags, hyperlinks, and numerous other types of data.

The content will typically be returned to the user's computing device 120, whereupon it is typically rendered, executed, and/or displayed by the browser as a page 124. Browsers will also typically create an entry in a URI history 122 corresponding to the fulfilled request, here Site3.com. The exact mechanism of creating such an entry varies according to the type of browser 121 being used. One of skill in the art will recognize, however, that browser history entries are typically created upon successful fulfillment (or, possibly, initiation) of a request. Entries may be pruned from the URI history if a given entry is not revisited in a period of time, if a given entry is not within the top N most recently accessed entries, through another algorithm, or some combination thereof. Here, for example, after receiving content in satisfaction of the request for content at URI http://site3.com, the user's browser 121 may create an entry in its history 122 for Site3.com, e.g. the entry referenced at label 134. One of skill in the art will recognize that "surfing" a web site, i.e. requesting a first page, then clicking on a link to a second page from the first page, then clicking on a link to a third page from the second page, and so forth, will typically tend to create a sequence or trail of entries in the URI history 122, such as that illustrated by references labels 134-36. So, for example, the user may navigate from Site3's home page (site3.com) to view Site3's privacy policy and opt-out page, site3.com/privacy/.

Additionally, in fulfilling a request, the web server may access the optional setting service 105. The setting service may be implemented as a collection of data, objects, or methods, or parts of data, objects, or methods, located on one or more servers, that provides URIs for transmission to browsers, where the URIs are used to store state information. So, for example, when a given user requests Site3's privacy policy page, site3.com/privacy, the setting service may include as part of the content of site3.com/privacy a special URI for transmission to the user. This URI may such that, if placed in the user's URI history, the URI will indicate that the user wishes to confirm that they want to opt out of Site3's user tracking mechanisms. The URI could be http://site3.com/opt-out and could be transmitted to the user as an HTTP anchor tag in the content of site3.com/privacy, e.g. "<a href="http://site3.com/opt-out">Click here to confirm your desire to opt-out</a>". This content may be returned by the setting service 105 to the web server 104, and the web server may include this URI content as part of its complete response to the user's request for site3.com/privacy. The testing service may access a database 107 to store, retrieve, or determine information appropriate to the URI. For instance, the testing service may cause an entry to be stored in the database 107, where the entry connotes that the URI http://site3.com/opt-out indicates that a user does not wish to be tracked.

As discussed above, once the browser 121 receives the response content, it will typically be displayed in the browser's page display area 124. If the user clicks on the link containing the special URI, it will cause a request to be made to the confirmatory URI (http://site3.com/opt-out) and cause an entry to be created in the user's browser's URI history 122, such as that shown at reference label 136. The actual content of the page at site3.com/opt-out may consist simply of the text "Thank you for opting out" or may be more or less extensive. It may contain links for the user to return to the home page of the web site. Of course, it is not necessary that the user be presented with an explicit anchor tag providing a link to a URI which serves as the opt out URI, nor is it necessary that the user click on a link or be notified that clicking on the link serves to cause storage of state information in the URI history 122.

Assuming that the user returns to Site3's home page after confirming the desire to opt out, the user may then subsequently browse to other pages in Site3's domain, such as shopping pages (site3.com/shopping), product review pages (site3.com/view/widget1039), etc. At each of these pages, and, in general, at any of Site3's pages, the Site3 web server 104 may include logic for tracking or monitoring the user's behavior. For example, the web server may typically maintain a history of all of the products viewed by a user. This history may be displayed to the user as content in the form of "Here are the last 7 products you viewed here at Site3.com . . . " Mechanisms for tracking user behavior are well-known in the art.

Before conducting tracking operations on a particular user, the web server 104 may determine whether the user has opted out of tracking. To do so, the web server may first poll the testing service 106. The testing service may be implemented as a collection of data, objects, or methods, or parts of data, objects, or methods, located on one or more servers, that provides code for inclusion as content of a requested webpage, where the code may be used to read state information out of the URI history 122 of the browser. So, in this case, the code may consist of a section of JavaScript, such as the JavaScript illustrated in Table 1, that, when executed, checks to see whether the user has visited site3.com/opt-out, and reports the results of this check to the web server 104. If the user has visited that URI, then the code section (and also the system, if the code section reported the results of the test) knows that the user has opted out of tracking. Returning to FIG. 1, the testing service may utilize the database 107 to store, retrieve, or determine information appropriate to checking for a URI. In this case, the testing service 106 may retrieve the entry regarding site3.com/opt-out originally placed in the database by the setting service 105.

TABLE 1

A pseudocode listing illustrating the use of entries in the URI history in accordance with some embodiments of the invention.

```
1:   mylink = createNewAnchorLink(http://www.opt-out.com);
2:   addElementToDocumentObjectModel(mylink);
3:   computedLinkColor = getComputedLinkColor(mylink);
4:   removeElementFromDocumentObjectModel(mylink);
5:   if (computedLinkColor = VISITED_COLOR) {
6:      RedirectTo("http://server1.com/products?optout=yes");
7:   } else {
8:      RedirectTo("http://server1.com/products?optout=no");
9:   }
```

The testing service 106 may return to the web server 104 a section of executable web code 125 adapted to be transferred to and executed on the user's browser 121. The web server will typically return the section of executable code to the user as part of the content of a complete web code response to the user's original request.

Once received by the user's computing device and browser 121, the browser may attempt to render the content in a content display area 124. Part of the rendering process may include executing code 125 included as part of the content. In this example, the user's browser may execute code 125 analogous to the pseudocode shown in Table 1. If the particular URI is present in the URI history, execution of a JavaScript code section 125 implementing the pseudocode of Table 1 may cause that information to be sent to the Site3 web server 104 as part of an additional request. In this case, the JavaScript 125 may detect the existence of the opt-out URI in the user's history 122 (Table 1, lines 1-5) and thereafter cause a redirect, e.g., a window.location( ) method call, to transmit that information to the web server 104 and load new content. (Table 1, lines 6 and 8.) Alternatively to causing an additional request, the JavaScript may set the value of a particular name-value pair if the opt-out URI is detected. This name-value pair may then be transmitted to the server 104 as part of a typical user-initiated submission of a web form.

The executable code may also or alternatively perform other types of processing based on the URI or URIs found in the history 122. These steps could include, but are not limited to, notifying the user, causing the browser to request a URI that is dependent upon the outcome of the URI check, causing a hidden display object to become visible on the page 124, deleting information in accordance with the user's privacy settings, and so forth. The executable code 125 may be adapted to perform some action, including reporting to the server, if the particular tested-for URI is not present in the URI history 122.

If the server receives notification from the executable code, either through a redirect, request, submission of a name-value pair, or other mechanism, that the user has chosen to opt-out or opt-in, the server may implement the user's particular opt-out privacy wishes. This may involve, for example and without limitation, any of the following: (1) not including tracking widgets (as known in the art) in subsequent requests by the user; (2) deleting data or disabling functionality on the web server with respect to the user; and/or (3) disabling functionality, such as tracking functionality, on the user's computing device (in accordance with the user's preferred opt-out choice).

Those of skill in the art will recognize that the foregoing process of enforcing the user's opt-out choice does not require (but is compatible with) the use of session histories, caches, cookies, execution of a privileged applet, or other usual mechanisms for maintaining state. On the other hand, the foregoing process may be used in combination with the above-mentioned mechanisms. For example, upon detecting that a particular URI is in the URI history, the executable code 125 executing on the user computing device 120 may cause a cookie 140 to be created in the cookie repository 123.

It will be recognized that the setting service 105, as described, is optional. Some embodiments may be practiced without a setting service. In some of these embodiments, the URIs of particular visited web pages may still be stored in the browser's URI history 122, and the testing service 106 or web server 104 may maintain a record of which URIs correspond to which elements of state.

Additional processing, in lieu of or in addition to that described above, may be performed by the executable code 125. This may include deleting information according to the user's privacy settings (such as cookies), notifying the user (such as a notification that the privacy policy is being respected), redirecting to or causing the browser to request another page, requesting additional content from a server for display on the page, and/or modifying an element displayed on the page. In general, any type of action consistent with the expressive power of the executable code (and the privileges afforded to the code by the browser) may be performed.

TABLE 2

A code listing illustrating an example of a section of CSS semantics that makes use of entries in the URI history in accordance with some embodiments of the invention.

```
<style>
   #link1 a:visited {
      background:url(log.cgi?ip=76.247.104.87&date=2008-04-
   13&uri=opt-out.com&visited=1);
   }
   #link1 a {
         background:url(log.cgi?ip=76.247.104.87&date=2008-04-
   13&uri=opt-out.com&visited=0);
   }
</style>
<div id="link1">
   <a href="http://opt-out.com/">
      opt-out.com
   </a>
</div>
```

It will also be recognized that the use of JavaScript is merely one mechanism for reading the URI history and taking action upon that history. Other methods include but are not limited to (1) conditional image loading as described at http://ha.ckers.org/weird/CSS-history.cgi, last visited Apr. 5, 2008, (2) browser applets and plugins, and (3) Java. An illustration of the use of CSS to infer the existence of objects is provided in Table 2. Those of skill in the art will recognize that the "background:url(log.cgi?ip=76.247.104.87&date=2008-04-13&uri=opt-out.com&visited=1)" line in CSS is rendered (and thus the log.cgi web resource is accessed) if the particular URI corresponding to the enclosing anchor tag, here opt-out.com is marked as "visited" (i.e. present in the URI history) by the browser. Similarly, the "background:url (log.cgi?ip=76.247.104.87&date=2008-04-13&uri=opt-out.com&visited=0)" is rendered if the test URI (opt-out.com) has not been visited.

4. Example Use Cases

Cross-Domain Opt-Outs

Figure 2:
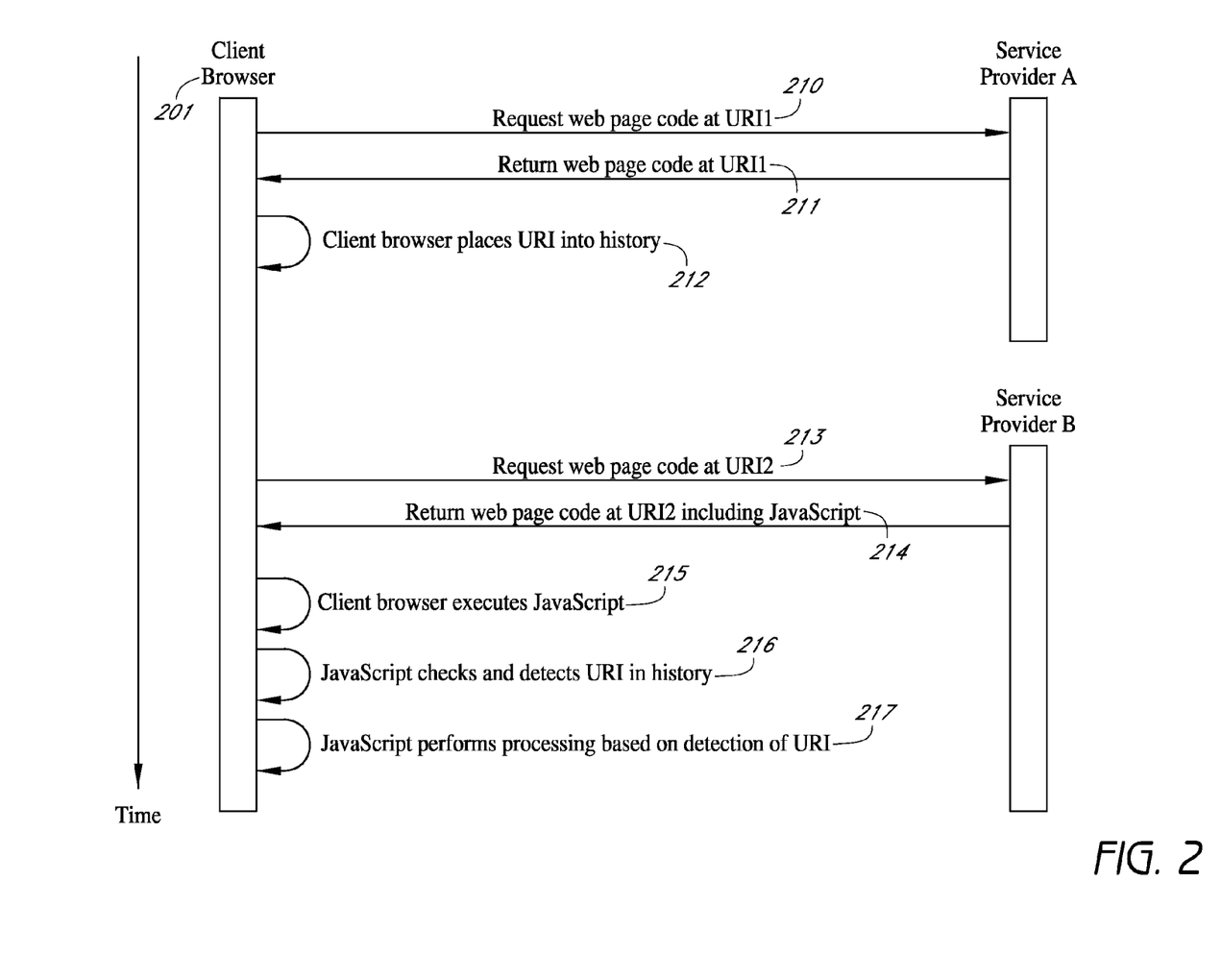
FIG. 2 is a browser interaction diagram illustrating information flow between a browser and service providers in accordance with some embodiments of the invention.

FIG. 2 illustrates an embodiment in accordance with cross-domain URI history detection and processing based thereon. Client 201 may be a user's computing device and browser or any device capable of communicating on a network. Service Provider A illustrates a web service provider acting as a generalized privacy policy provider. Web services generally include the provisioning of HTML pages, WL pages, RSS feeds, or generally any resource capable of transmission across a network. Service Provider B illustrates another web service provider, wherein Service Provider B is a provider that may normally be in a position to enforce or respond to privacy policy choices. Such providers include retail web sites, news sites, RSS feed syndicates, and so forth. For this example, Service Provider B is assumed to be on a different Internet domain (although the example still works for providers on the same domain). For purposes of the illustration shown in FIG. 2, Service Provider A and Service Provider B are automated computer systems or sites operated by different respective business entities.

Presume for the sake of the example that the client 201 has navigated through pages provided by Service Provider A and is now presented with the option of clicking on a text link or other hyperlinked display object to confirm the client's acceptance of a particular opt-out policy. Such a link may have a target URI such as http://spA.com/opt-out. A page displaying confirmation of the client's acceptance may be located at the URI. Of course, Service Provider A may provide additional opt-in and/or opt-out pages, and perhaps some of these may represent privacy choices specific to certain web sites or certain privacy actions. So, for example, such a page may have a URI such as http://spA.com/opt-in (for someone who explicitly agrees to all tracking) or http://spA.com/opt-out-class3 (where class 3 represents some admixture of privacy options.) Of course, Service Provider A's own root page (spA.com) may itself correspond to some selection of privacy choices by the user.

At 210, the client 201 makes a request to Service Provider 1 202 for one of the URIs discussed above. For the sake of generality, this URI will be referred to as "URI1". At 211, the service provider returns a response including web code to the client 201. This particular response may or may not include executable code. At 212, the client browser 201 renders the web page code and may subsequently place (or have previously placed) URI1 into the history.

At a subsequent time, as illustrated at 213, the client 201 may request a web page from Service Provider B. At 214, the Service Provider B will typically return web page code. In this example, the web page code includes a URI checking mechanism (here illustrated as JavaScript) that may be designed to check for the existence of URI1 (which, as the reader will recall, is a URI from Service Provider A) and then perform additional processing based on whether URI1 is detected. The JavaScript may be designed to test for multiple URIs, and may be designed to check for particular URIs based on some specific attribute of the requesting user (such as a user name, an IP address, and so forth).

The client browser 210 receives the web page code including the URI checking mechanism and, at 215, executes the JavaScript. At 216, the JavaScript checks for the existence of URI1 in the client's history. At 217, the JavaScript performs additional processing based on detection of the URI1. This additional processing may include requesting new content for the user; varying a parameter of a content request to cause a particular type of content to be displayed or omitted; declining to request particular content that would otherwise be displayed to the user; expanding the amount of data collected or retained from the user; exposing hidden information on the page; contracting the amount of data collected or retained from the user; scrambling, encrypting, or otherwise obfuscating the user's data or attributes; reconciling the user's URI history with the user's cookies or cache; confirming with the user that he or she wished to opt out; or generally any action that either should or should not be performed based on a state attribute of the user.

In this example, the additional processing may comprise sending data back to Service Provider B which indicates that the user has selected the given privacy policy at Service Provider A. Service Provider B may then choose to alter its data retention policy with respect to interactions with this user to conform to the user's privacy policy. Service Provider B may also choose to set, modify, or delete cookies (or name-value pairs) to record the privacy policy of the user. For example, Service Provider B may create a cookie, similar to that illustrated at FIG. 1, 140, which is consistent with the detected global opt-out URI. On the other hand, Service Provider B may create a cookie which overrides the global opt-out URI.

Differential Content Selection

Figure 3:
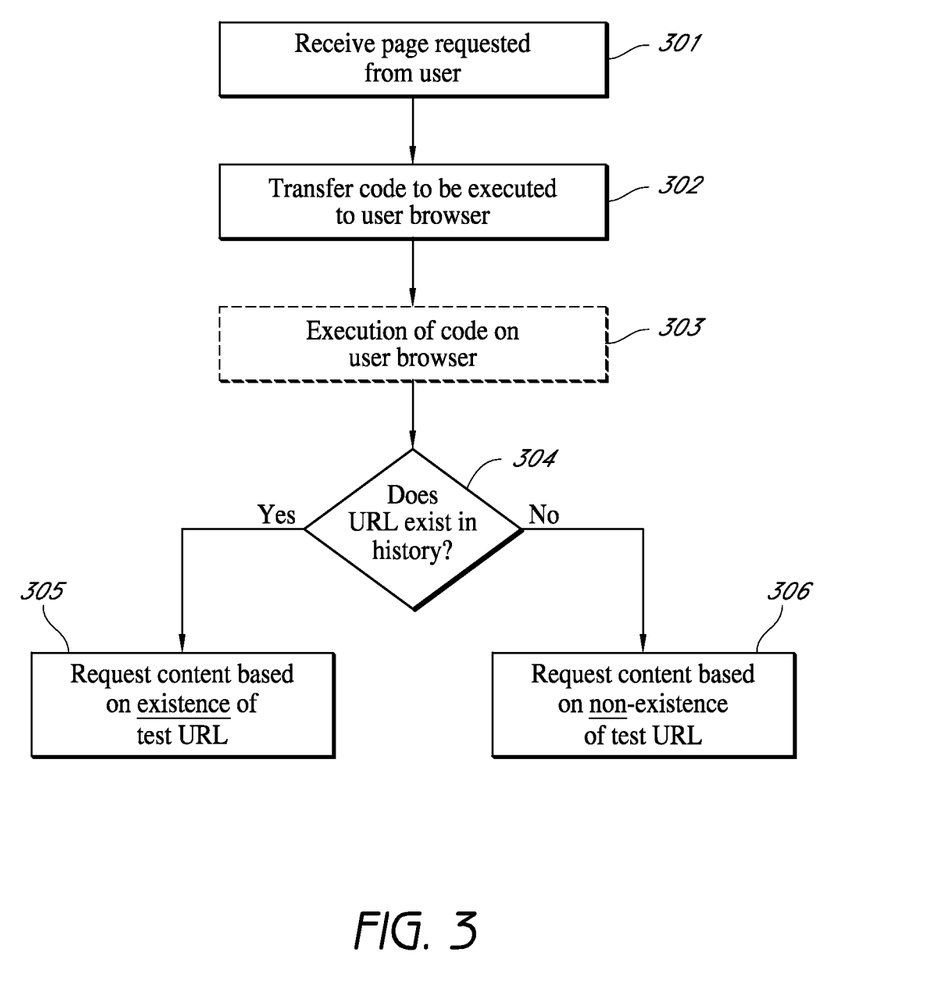
FIG. 3 is a flowchart illustrating an algorithm for checking state information stored in browser history in accordance with some embodiments of the invention.

FIG. 3 illustrates an embodiment in accordance with maintenance of user state information. At 301, the server receives a page request from a user. At 302, the server responds with a transfer of code to be loaded or executed by the user. Typically this code will include a mechanism for checking the existence of items in the URI history of the user's browser. At 303, the code is loaded or executed on the user's browser and computing device.

In this example, assume that the code is testing for the existence of a URI which indicates that the user has viewed a "Fire Sale! 20% Off Everything" page. This URI may be https://merchant.com/firesale.html. At 304, the code tests for the fire sale URI. If the URI is found in the user's history, the code may cause a transmission to the merchant to indicate that fact. Alternatively, if the URI is not found, the code may cause a transmission to indicate that fact as well.

In this example, assuming that the URI was found in the history (Block 305), the code may explicitly make a particular redirection request to the server. Here, the code may cause a request for the web page at URI location http://merchant.com/products?salepercent=20. Alternatively, at block 306, assuming that the URI was not found in the history, the code may explicitly make a request for a different URI location, such as http://merchant.com/products?salepercent=10. In this way, the system is able to differentiate seamlessly among users who have visited different sets of pages and to provide different content to those different users—without reliance upon cookies or caches.

Affiliate Tracking and Commissions

Web merchants often use affiliates, wherein the affiliates receive a commission in exchange for directing traffic to merchant web sites. This commission may be payable when a particular user clicks on a link from the affiliate's web site to the merchant site, or the commission may only be payable if the particular user subsequently purchases the item to which the user is directed.

The merchant's system may implement affiliate tracking by checking for URIs of affiliates or products of affiliates in user URI histories. So, for example, if a user purchases a particular grill from a merchant, the merchant's system may transfer web code to the user to check if the URI history of the user contains an affiliate's product page. In other words, if affiliate.com/grill.html links to merchant.com/grill.html, then the merchant's system may (using the methods disclosed above) check for the existence of affiliate.com/grill.html in the URI history. The merchant system may check for multiple affiliates and, in case a user has visited multiple appropriate pages, the merchant may arbitrate the conflict. The conflict may be resolves by splitting the commission among the affiliates.

This system may be used concurrently with a cookie- or session-based approach.

Generalized State Storage

The disclosed processes may also be used to store generalized, multi-bit state data. The setting service 105 may cause a user's browser to be directed or redirected to multiple URIs, each of which encodes a piece of information (which may be less than, equal to, or greater than one bit of information). The URIs that form the state data may be explicitly linked together (such as site.com/bit1, site.com/bit2, etc.) or they may be encrypted, obfuscated, or otherwise non-obvious. They may encode state in binary (as shown below) or in other some other base. The content at the particular URIs may be special purpose (presumably like site.com/bit1) or they may themselves serve useful purposes outside of storing state (such the site.com/opt-out examples demonstrated earlier).

The setting of multiple URIs may be accomplished with the help of the user (such as by asking the user to click on multiple links) or may be accomplished automatically (such as by causing multiple re-directs). In general, methods for causing loading of or redirecting to a chain or set of multiple web pages are well-known in the art and may be appropriate for causing storage of multiple URIs in the history. It is possible, however, that not all browsers support all methods for loading or storing multiple pages.

To illustrate the example of storing generalized state, to store the value 6 (0110 in binary), the system or setting service could cause the loading of 2 distinct pages: site1.bit2 and site2.bit1. (The reader will recall that $6=2^2+2^1$.) To retrieve the encoded state in subsequent request, a section of JavaScript may be executed. The section may check for the existence of site.com.bit,*, where * varies from 0 (representing $2^0=1$) to 3 (representing $2^3=8$). In this example, the JavaScript will detect bit1 and bit2 and thus reconstruct 2+4=6.

The number or identifier thus reconstructed, along with other information known about the request or the user, may be used to reference a record stored by the server. This record may contain further information about the user, such as preferences, demographic groups, etc.

Prevention of Deep-Linking

One problem often encountered by web providers is that of "deep linking" wherein third parties serve links to pages "deep" within a web site (such as photographystore.com/pictures/image20394.html). This type of linking may frustrate the intentions of the web provider if, for example, the web provider would prefer that visitors see the site's home page (e.g. photographystore.com/welcome) before viewing content. This problem is especially acute, for example, with news providers (such as cnn.com) whose stories may be deep-linked by web search providers. Deep-linking can be a source of litigation.

Some embodiments of the present invention may alleviate deep-linking as follows: When serving a response to a content request by a user, especially a request that includes a HTTP-Referrer string that points to a $3^{rd}$-party site, the web service may include a section of web code that uses the URI history to determine whether the user has previously visited the home page of the service provider. If not, the web code may categorize the user's access as one of deep linking (since the user has visited an inner link without first visiting the home page). The web code may thereafter cause the user to be redirected to the home page. Alternatively, the web code may cause the page displayed to the user to be modified in some way, perhaps by causing a popover or similar to be displayed on the user's browser.

Variant State

Typical browsers may not afford JavaScript (or other mechanisms for accessing URI histories as discussed above) sufficient privileges to remove or modify URI entries. Some embodiments of the present invention may overcome this write-once limitation by providing a mechanism for marking URIs in the history as outdated or invalidated. Some embodiments may store "epoch counter" URIs in the history, so as to allow "stale" URIs in the history to be ignored. The broad idea behind epoch counting is that once a new epoch has started (e.g. Epoch 3), items marked with previous epochs (e.g. Epochs 0, 1, and 2) are invalidated.

As an example, suppose that a system wishes to record the opt-out or opt-in preferences of its users in a URI history and, moreover, wants to allow users to modify their preferences over time. In order to read the user's current preference, the system may transmit JavaScript or other history-checking code to the user that first checks a sequence of epoch URIs. Some embodiments of the invention may therefore first check to find the current epoch and subsequently invalidate (or otherwise deprecate) URIs corresponding to previous epochs.

So, for example, the JavaScript may first check for URI site4.com/privacy_epoch0. If this URI does not exist, the system knows that the user has not set privacy preferences (or has recently had them removed or expired from the URI history). If, however, site4.com/privacy_epoch0 exists, the system may check for site4.com/privacy_epoch1. If epoch 1 does not exist, the system knows that the current epoch is 0. If, however, site4.com/privacy_epoch1 exists, the system may check for site4.com/privacy_epoch2. If epoch 2 does not exist, the system knows that the current epoch is 1. If, however, site4.com/privacy_epoch2 exists, the system may check for site4.com/privacy_epoch3, and so on. Eventually, the system may find the last epoch that has a corresponding URI entry—this will be the current epoch.

The system may then use this current epoch as a key for referencing the actual state value in the URI history. For example, if the current epoch is 2, then the system may look for site4.com/privacy_epoch2 opt-in, site4.com/privacy_epoch2 opt-out, site4.com/privacy_epoch2 bit1, and so forth and as described above. The system may ignore any state values associated with expired epochs. (Such as site4.com/privacy_epoch1_opt-in.)

In order to store or modify state values, the system may first determine the current epoch (using a mechanism like that discussed above) and any relevant state values. The system may then present the user with links containing specially crafted URIs that increment the epoch counter and set the new value. So, for example, if the system detects that the current epoch is 17, the setting service and web server may transmit web code to the user's browser that causes a URI or URIs representing both an incremented epoch counter (such as site3.com/privacy_epoch18) and a new state value (site.com/privacy_epoch18 opt-in) to be stored in the history. Example mechanisms for storing multiple URIs are discussed above.

Separate epoch counters (such as site4.com/privacy_epoch2), represented as distinct URIs, are not necessary. Some embodiments may scan through possible state values to determine the one with the highest implicit epoch number. For example, a system may start by checking for values with epoch=0, such as site5.com/opt-in_0 and site5.com/opt-out_0. Presumably, only one of these will exist (otherwise they would indicate inconsistent state). If either of these are found, the system may scan for values with epoch=1, such as site5.com/opt-in_1 and site5.com/opt-out_1. If nothing under epoch 1 is found, then the system knows the value or values it found under epoch 0 are current. If, however, something is found under epoch 1, then the system will scan for values under epoch 2, and repeat the process. Eventually, a set of values with an epoch number not exceeded by any other value will be found. In some embodiments, these will be the current values.

Of course, mechanisms other than epochs may be used, including (without limitation) timestamps, datestamps, hashed values, and/or other state values encoded as described above under "Generalized State Storage."

5. Conclusion

All of the methods and processes described above may be embodied in, and fully automated via, software code modules executed by one or more general purpose computers or processors. The code modules may be stored on any type of computer-readable medium or other computer storage device.

Although this invention has been described in terms of certain embodiments and applications, other embodiments and applications that are apparent to those of ordinary skill in the art, including embodiments and applications which do not provide all of the features and advantages set forth herein, are also within the scope of this invention. Accordingly, the scope of the present invention is intended to be defined only by reference to the claims.

What is claimed is:

1. A computer-implemented method, comprising:
communicating, by a user computing device, a preference using a first Uniform Resource Identifier (URI);
storing, by the user computing device, the first URI in a history of the user computing device, the history including a plurality of URIs and the first URI represents the preference;
communicating, by the user computing device, a request for content using a second URI;
receiving, by the user computing device, in response to the request for content, code configured to detect the presence of the first URI in the history;
executing, by the user computing device, the code to determine that the first URI is included in the history; and
in response to determining that the first URI is included in the history, performing additional processing related to the requested content according to the preference.

2. The method of claim 1, wherein the preference is an opt-out setting.

3. The method of claim 2, wherein the opt-out setting applies to multiple different web sites, each of which is operated by a different respective entity in a different respective Internet domain.

4. The method of claim 1, wherein the first URI is stored in the history as a result of a user selection action performed on a web page of a first web site in a first domain, and the code is received from a web page from a second web site in a second domain.

5. The method of claim 1, wherein the code comprises JavaScript.

6. The method of claim 1, wherein the code conforms to Cascading Style Sheet semantics.

7. The method of claim 1, wherein the code comprises a Java applet.

8. A computer storage system having stored thereon a browser-executable code sequence stored on a non-transitory computer readable medium that embodies the method of claim 1.

9. A web server system operative to serve one or more web pages that include browser-executable code that embodies the method of claim 1.

10. A system, comprising:
a server including executable code stored in a non-transitory computer readable medium that is executable by a processor to cause the server to:
provide access to at least one web page that provides a user option to select a content preference, and
receive a communication from a user comprising a user's selected content preference;
a setting service that is responsive to the user's selected content preference by communicating a Uniform Resource Identifier (URI) representing the user's selected content preference, the URI thereafter being incorporated into a browser history including a plurality of URIs stored on a user computer; and
a testing service that is responsive to a page request from said user computer by returning to the user computer a browser-executable code sequence configured to perform the following operations when executed:
determine whether the URI is included in the browser history,
perform first processing associated with the page request when the URI is included in the browser history, and
perform second processing associated with the page request when the URI is not included in the browser history, wherein the second processing differs from the first processing.

11. A computer-implemented method, comprising:
receiving a selected user preference setting from a user computing device, the user preference setting being directed to a Uniform Resource Identifier (URI) representing the user preference setting;
receiving a page request from the user computing device;
retrieving a code sequence from a database based on the page request, wherein the code sequence, when processed, checks a browser history of the user computing device for the presence of the URI that represents the user preference setting; and
providing, to the user computer device, a web page that includes the code sequence for execution at the user computing device, and that causes the user computing device to request first content when the URI representing the user preference setting is in the browser history of the user computing device and causes the user computing device to request second content when the URI representing the user preference setting is not in the browser history of the user computing device.

12. A method for serving web content, comprising:
providing a Uniform Resource Identifier (URI) representing a selected preference to a user's computing device;
receiving a request from the user's computing device for content;
providing to the computing device, in response to the request, content comprising code configured to be rendered or executed on the user's computing device, the code configured to check for the presence of the URI representing the selected preference in a URI history of the user's computing device, the URI history comprising a plurality of URI's not representing the selected preference; and
returning a transmission to the user's computing device used when the URI representing the selected preference is in the URI history of the user's computing device and not returning the transmission when the URI representing the selected preference is not in the URI history of the user's computing device.

13. The method of claim 12, further comprising providing a second content to the user's computing device, the second content being a response to the transmission, wherein the second content varies as a function of the transmission.

14. The method of claim 12, further comprising providing a second content to a second request by the user, wherein the second content varies as a function of the transmission.

15. The method of claim 12, further comprising providing services to the user's computing device that vary as a function of the transmission.

16. The method of claim 12, further comprising adjusting the amount of information retained about the user based upon the transmission.

17. The method of claim 12, wherein the code comprises JavaScript.

18. The method of claim 12, wherein the code conforms to Cascading Style Sheet semantics.

19. The method of claim 12, wherein the code comprises a Java applet.

20. A system for maintaining user state, comprising:
a web server;
a setting service; and
a testing service; wherein
the web server containing instructions on a non-transitory computer readable medium that are executable by a processor to cause the web server to respond to requests for content by a user's computing device with content from the setting service and the testing service;
the setting service is configured to provide a sequence of at least one Uniform Resource Identifier (URI) to which the user's computing device will be redirected or linked, the at least one URI containing information representative of a state value associated with the user; and
the testing service is adapted to provide to the computing device, code configured to be rendered or executed on the computing device, wherein the code includes information from a database used for checking for the presence of the at least one URI in a URI history of the user's computing device and the code is further configured to perform operations based on the presence of the at least one URI, the operations associated with the state value represented by the at least one URI.

21. A computer-implemented method, comprising:
communicating, by a user computing device, a user preference setting using a resource representing the user preference setting;
storing, by the user computing device, the resource representing the user preference setting in a repository including a plurality of resources
receiving, by the user computing device code that when executed determines that the resource representing the user preference setting is included in the plurality of resources; and
in response to determining that the resource representing the user preference setting is included in the repository, causes the user computing device to generate a first request for content corresponding to the user preference setting and in response to determining that the resource representing the user preference setting is not included in the repository, causing the user computing device to generate a second request for content not corresponding to the user preference setting.

22. The method of claim 21, where the plurality of resources is associated with records of prior user actions.

* * * * *